(12) United States Patent
Backaert et al.

(10) Patent No.: US 9,567,140 B2
(45) Date of Patent: Feb. 14, 2017

(54) CONTAINER WITH DRIP-PROOF CAP

(71) Applicant: Dart Industries Inc., Orlando, FL (US)

(72) Inventors: Dimitri M. J. C. Backaert, Moorsel (BE); Kris Schoukens, Zwevegem (BE); Robijn Dufloo, Bierbeek (BE)

(73) Assignee: Dart Industries Inc., Orlando, FL (US)

( * ) Notice: Subject to any disclaimer, the term of this patent is extended or adjusted under 35 U.S.C. 154(b) by 97 days.

(21) Appl. No.: 14/303,162

(22) Filed: Jun. 12, 2014

(65) Prior Publication Data

US 2015/0360831 A1 Dec. 17, 2015

(51) Int. Cl.
| | | |
|---|---|---|
| *B65D 47/40* | (2006.01) | |
| *A47G 23/16* | (2006.01) | |
| *B65D 23/06* | (2006.01) | |
| *B65D 25/56* | (2006.01) | |
| *B65D 41/26* | (2006.01) | |
| *B65D 41/56* | (2006.01) | |
| *B65D 47/08* | (2006.01) | |
| *G01F 19/00* | (2006.01) | |
| *B65D 47/12* | (2006.01) | |

(52) U.S. Cl.
CPC ............... *B65D 47/40* (2013.01); *A47G 23/16* (2013.01); *B65D 23/06* (2013.01); *B65D 25/56* (2013.01); *B65D 41/26* (2013.01); *B65D 41/56* (2013.01); *B65D 47/08* (2013.01); *B65D 47/12* (2013.01); *G01F 19/00* (2013.01); *B65D 2203/04* (2013.01)

(58) Field of Classification Search
CPC ......... G01F 19/00; B65D 47/40; B65D 47/12; B65D 23/06; B65D 47/08; B65D 25/56; B65D 2203/04; B65D 41/56
USPC .................. 222/556, 158, 29, 109, 108, 111
See application file for complete search history.

(56) References Cited

U.S. PATENT DOCUMENTS

| | | | |
|---|---|---|---|
| D170,840 S | 11/1953 | Tupper | |
| 2,752,971 A | 7/1956 | Tupper | |
| 3,820,692 A | 6/1974 | Swett et al. | |
| D233,116 S | 10/1974 | Swett | |
| 4,292,846 A * | 10/1981 | Barnett | G01F 19/00 206/219 |
| 5,509,579 A * | 4/1996 | Robbins, III | B65D 47/0814 222/109 |
| 5,547,275 A | 8/1996 | Lillelund et al. | |
| D374,147 S | 10/1996 | Lillelund et al. | |
| 5,605,240 A * | 2/1997 | Guglielmini | B65D 41/485 215/235 |

(Continued)

*Primary Examiner* — Kevin P Shaver
*Assistant Examiner* — Robert Nichols, II
(74) *Attorney, Agent, or Firm* — Taylor J. Ross

(57) ABSTRACT

A container providing improved features. The container prevents uncontrolled dripping of a liquid and directs a liquid drop present on a cap which closes the spout back into the container when the cap is open. The container includes a series of measuring indicators on the base for measuring a volume of material, such as a liquid. Also, the cover includes a further series of inverted measuring indicators for measuring a volume of material. The invention likewise includes a measuring device for measuring two or more liquids or dry ingredients such as by providing volume measuring indicators on a cover for a container as well as on the container. The measuring device may be a single measuring device which measures two or more liquids or dry materials, and may be configured for mixing the measured materials together in the same measuring device.

9 Claims, 8 Drawing Sheets

(56) References Cited

U.S. PATENT DOCUMENTS

| | | | | |
|---|---|---|---|---|
| 5,785,209 | A | * | 7/1998 | Guglielmini ......... B65D 47/043 222/153.07 |
| 6,109,487 | A | * | 8/2000 | Hashimoto ............. A47J 43/27 222/109 |
| 6,244,470 | B1 | * | 6/2001 | Harley-Wilmot ..... G01F 11/263 222/153.14 |
| 6,283,317 | B1 | * | 9/2001 | Benoit-gonin ..... B65D 47/0838 215/235 |
| 6,422,426 | B1 | * | 7/2002 | Robbins, III ...... B65D 47/0814 222/158 |
| 6,481,588 | B1 | * | 11/2002 | Wagner ................ B65D 41/485 215/235 |
| D532,650 | S | | 11/2006 | de Groote |
| D534,393 | S | | 1/2007 | de Groote |
| D552,929 | S | | 10/2007 | de Groote |
| D553,435 | S | | 10/2007 | de Groote |
| D699,996 | S | | 2/2014 | De Leo |
| 2007/0095863 | A1 | * | 5/2007 | Vangeel ............... B65D 47/263 222/519 |

\* cited by examiner

CONTAINER WITH DRIP-PROOF CAP

CROSS REFERENCE TO RELATED APPLICATIONS

This application is related to co-pending Ser. No. 29/493,694, filed herewith, the contents of which are incorporated herein by reference.

STATEMENT REGARDING FEDERALLY SPONSORED RESEARCH

Not applicable.

BACKGROUND OF THE INVENTION

The present invention relates in general to liquid storage containers having a dispensing spout. More particularly, the invention relates to a container for receiving a liquid and/or a granular material, such as a powder, with pouring spout and a drip-proof cap. This container will have a spout and a cap for opening and closing the spout, the cap including a drip guide for causing any contents residue (liquid or powder) on the cap to be directed into the spout when the cap is open to cause drops on the cap to go into the container; that is, to avoid undesirable drips on the container. Additionally, the invention relates to a food shaker having separate measuring devices for measuring two liquids and/or granular materials The invention further includes a mixing device including two separate mixing devices combined as a unit which can be used to measure volumes of liquids and granular material such as powder.

Containers having pouring spouts are well known, and it is also well known to provide a cap for closing the spout. Examples include liquid laundry detergent containers, pancake syrup containers or bottles, oil (cooking, lubricating, etc.) containers, sauce bottles (such as soy sauce), dry powdered spice containers, etc. While the present invention may have application in any such use, it will be described in the setting of a shaker. Shakers, such as food shakers and mixing devices are known. Measuring devices are known in general. Known food shakers include a container into which a user pours both a liquid and a powder, which the user has measured using a separate device or packet of powder, for example. Such known devices all have drawbacks, such as difficulty of use, cleaning, and lack of versatility. Some known shakers include parts to assist in the mixing of the liquid and powder, such as one or more mixing balls that move around in the closed shaker to enhance the mixing process. There are known shakers on which a base is provided solely for measuring a liquid volume of a liquid put into the base by a user. Some shakers include a base in which there are indicator lines indicating different volumes of liquid.

SUMMARY OF THE INVENTION

An object of the present invention is to provide a container with drip-proof cap, such as a food shaker, which overcomes the drawbacks of the prior art.

Another object of the present invention is to provide a container, such as food shaker, which is easier to use, has a base and a cover, the container suited for receiving and measuring a liquid or powder, and a cover particularly suited for receiving and measuring a liquid or granular material, such as a powder.

A further object of the present invention is to provide a container with drip-proof cap such as a food shaker for mixing liquids and powders and which reduces undesired drips on an exterior of the food shaker or on a food preparation surface.

Yet another object of the present invention is to provide a food shaker which is suited for measuring and shaking liquids and granular materials, such as powders, and having multiple measuring devices for measuring such liquids and powders.

Another object of the invention is to provide a measuring device which includes two separate measuring components, particularly suited for measuring a liquid and/or a granular material, respectively.

These and other objects are achieved by a container with drip-proof cap and a measuring device providing improved features.

In sum, the invention is directed to a container with drip-proof cap for preventing uncontrolled dripping of a liquid and for directing residue on a cap back into the container when the cap is open.

The invention likewise includes a measuring device for measuring two or more liquids or dry ingredients such as by providing volume measuring indicators on a cover for a container as well as on the base. The measuring device may be a single measuring device which measures two or more liquids or dry materials, and which may be configured for mixing the measured materials together in the same measuring device.

Relative terms, such as left, right, up, and down, are for convenience only and are not intended to be limiting.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
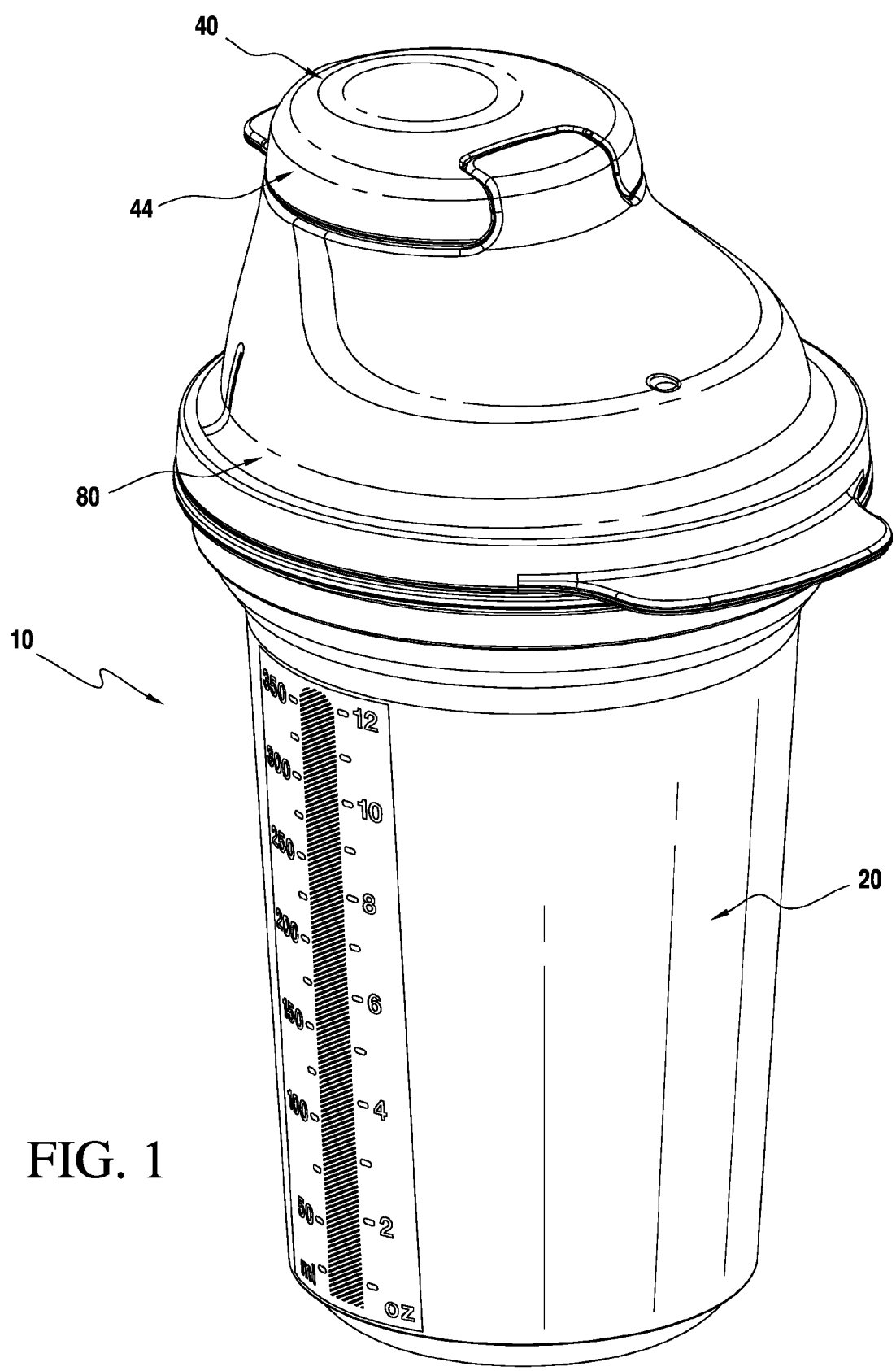
FIG. 1 is a top front perspective view of the container according to the present invention in the operative configuration.
Figure 2:
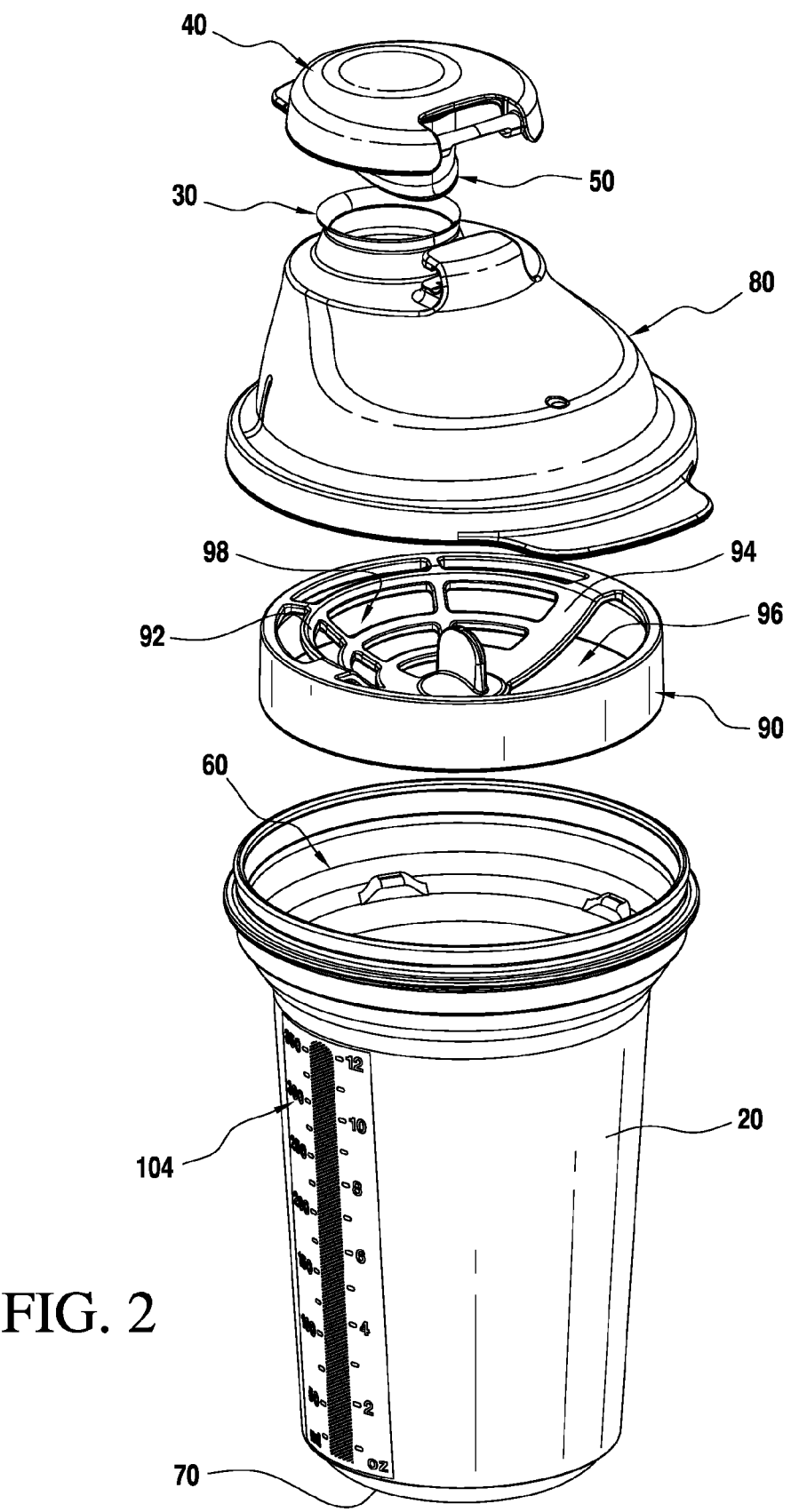
FIG. 2 is an exploded view of the container of FIG. 1.
Figure 3:
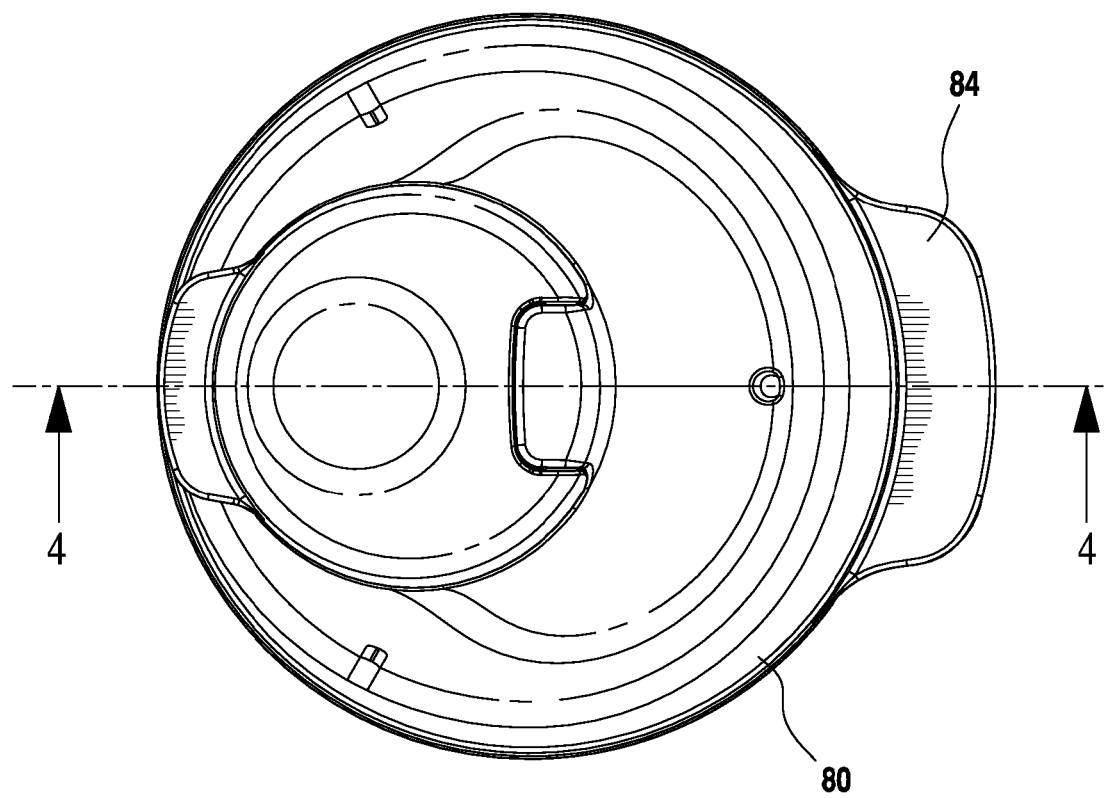
FIG. 3 is a top plan view of the container of FIG. 1.

FIGS. 1-11 illustrate an embodiment of a container with drip-proof cap 10 which includes a spout 30 for pouring the contents out of the container. The contents may be liquid, granular, powder or a mixture thereof but are intended to be flowable such that dispensing via flow out of the spout is possible.

The container 10 includes a cap 40 provided for spout 30, the cap 40 pivoting (typically manually) between a closed position 44 in which the cap prevents material from being poured from spout 30, and an open position 48 in which a material can be poured from container 10 out of the spout.

Figure 4:
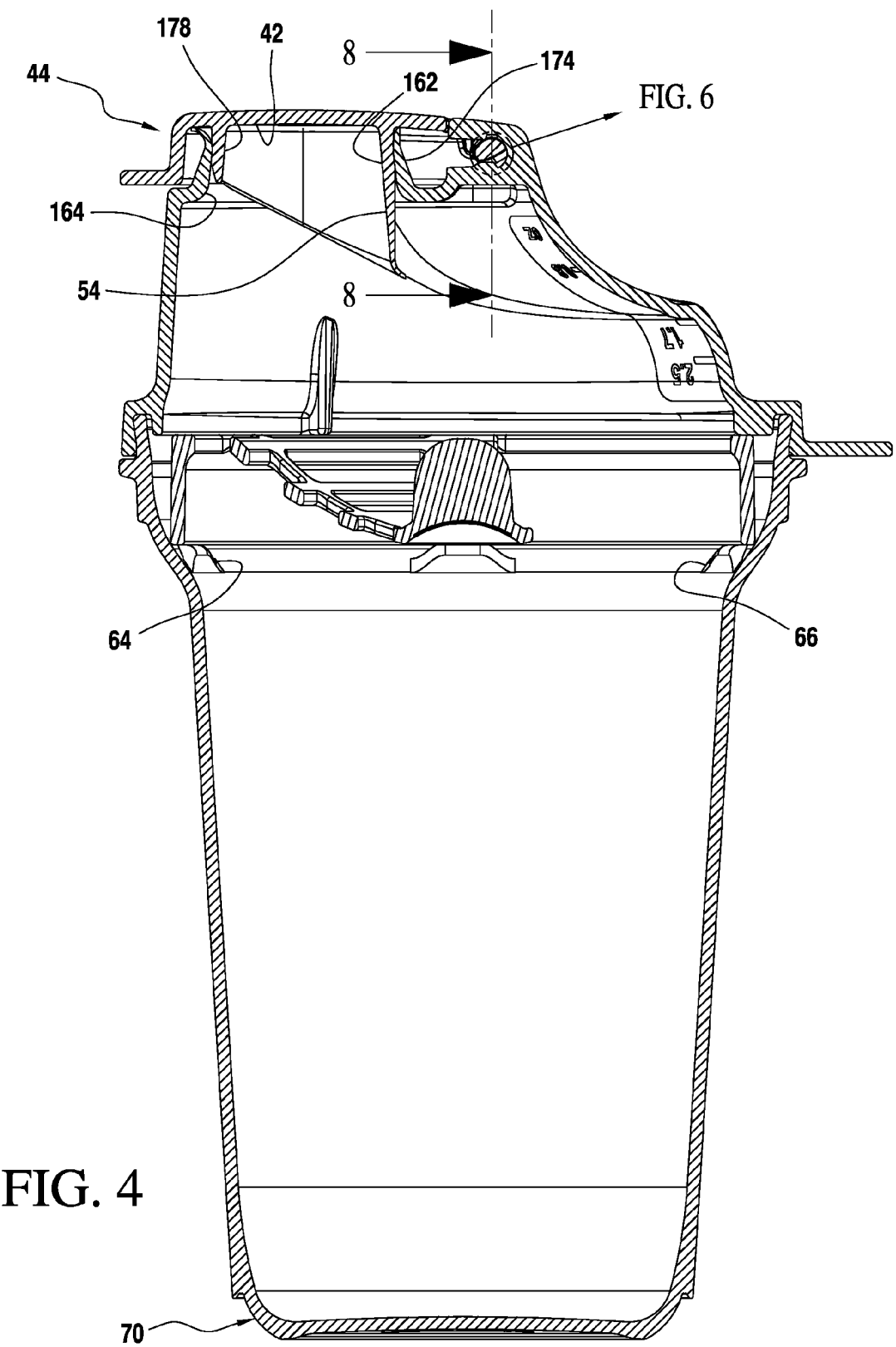
FIG. 4 is a cross-sectional view along line 4-4 of FIG. 3 showing the cap in its closed position.

There likewise is a guiding device 50 provided on an inner face 42 of cap 40. As best shown in FIG. 4, guiding device 50 is placed on inner face 42 so as to be received within the spout 30 when the cap is in the closed position 44. Further the exterior face of the guiding device 50 is sized and shaped to fit snugly within and seal against the interior walls of the spout 30 when in this same closed position 44. As may be envisioned, should the container 10 be tipped the contents which might flow up the spout will actually flow up the guiding device 50 and thereafter against the inner face 42 of cap 40 (within the confines of the guiding device 50). As such, when the container is placed upright again, any residual liquid contents (or powder) 55 present on the inner face 42 will remain and be present only within the confines of the guiding device 50. The guiding device 50 is configured for guiding one or more drops 51 and 53 of residual liquid (or powder) 55 on the cap into the spout 30 and, hence, into container 20, when cap 40 is in open position 48.

Figure 5:
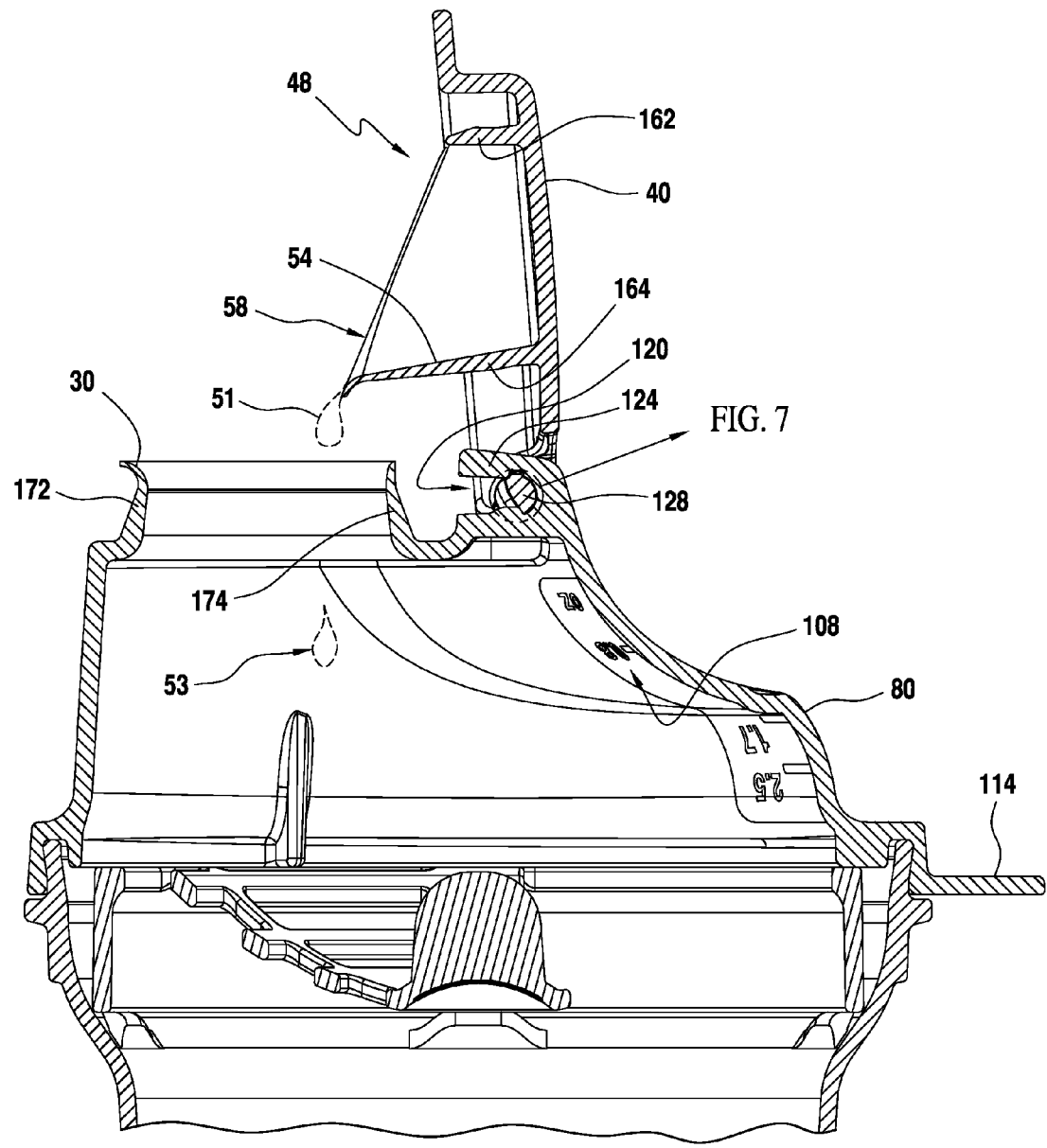
FIG. 5 is a cross-sectional view similar to FIG. 4 showing the cap in its open position.

Guiding device 50 may include an extension 54 having an angled portion 58 for concentrating the liquid directed from inner face 42 into spout 30. In particular, the free edge of the extension 54 will be located above, and within the periphery of, the spout 30 when the cap 40 is in the open position 48. As may be best seen with reference to FIGS. 5 and 10, angled portion 58 further guides and directs liquid 55 into container 10. Some of liquid 55 will drip off guiding device 50 in the form of drops 51, 53 as shown in FIG. 5.

Container 10 may be a single unit, or may be formed in several pieces. In the shaker embodiment shown the container 10 is formed as a cup-shaped base 20 which has an open top 60, extensions 64 and 66, and lower end 70, along with a cover 80 which may be attached to and cover the open top 60, as will be readily appreciated, to keep the liquid in the container 10 during use, without loss of the liquid from container 10 during mixing, such as by shaking container 10, and pouring the liquid out of spout 30 into a further receptacle, such as a user's glass. Cover 80 may be securely and sealingly attached to base 20 at open top 60 as is well known. Permanent welding, removable screw connections, and a resilient groove seal are all examples which might be used to secure the cover.

It is further contemplated that spout 30 may be located on cover 80, as shown, for ease of use and cleaning, as will be explained in detail below.

Figure 9:
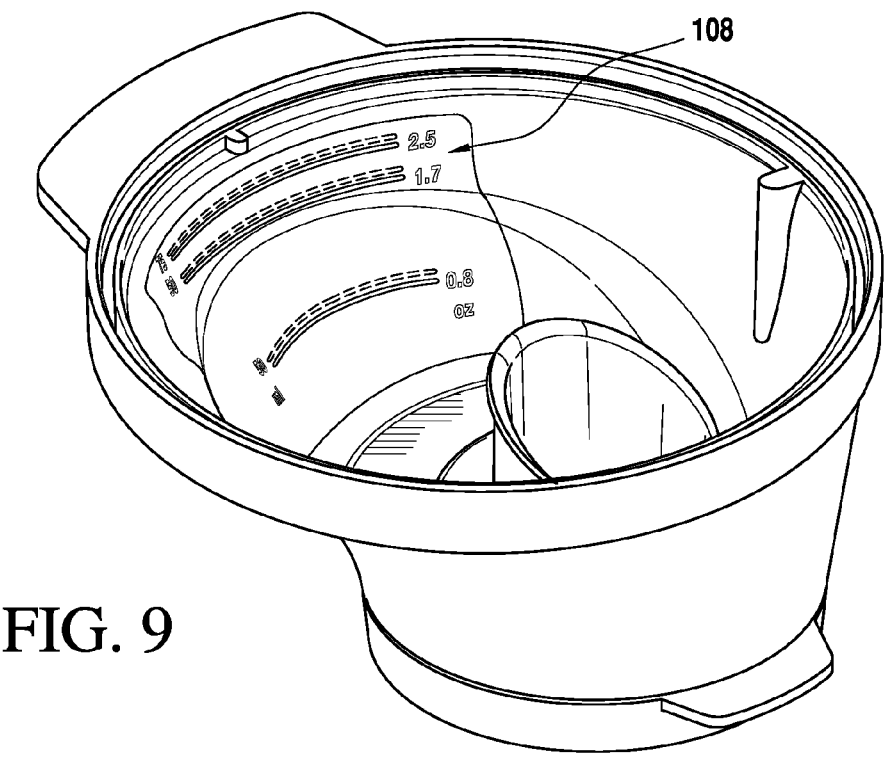
FIG. 9 is a perspective view showing the cover in an operative position for measuring a material.
Figure 10:
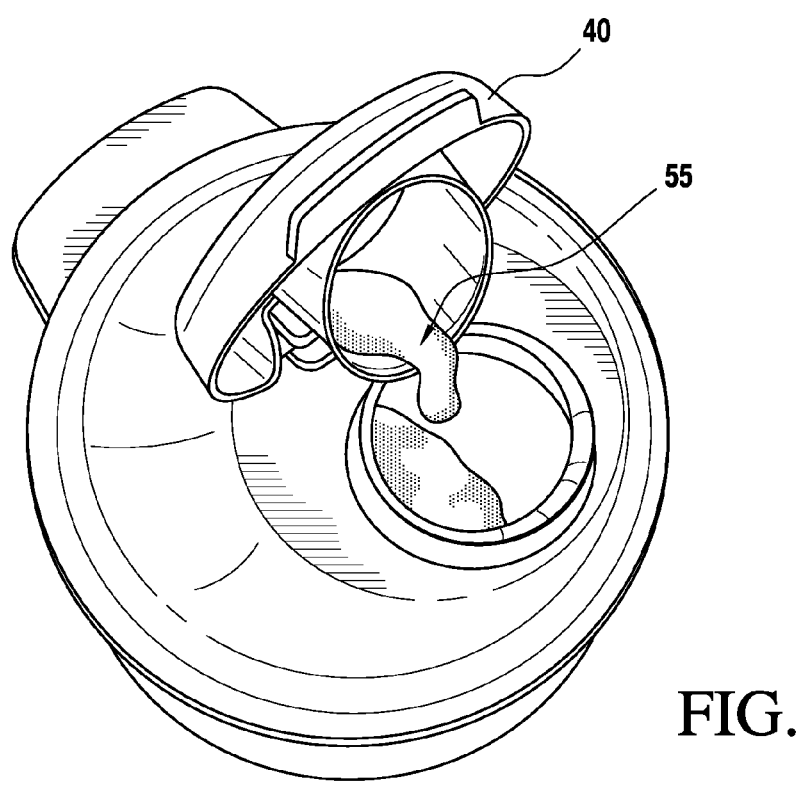
FIG. 10 is a top perspective view showing a liquid on the cap being directed by the guiding device into the container.
Figure 11:
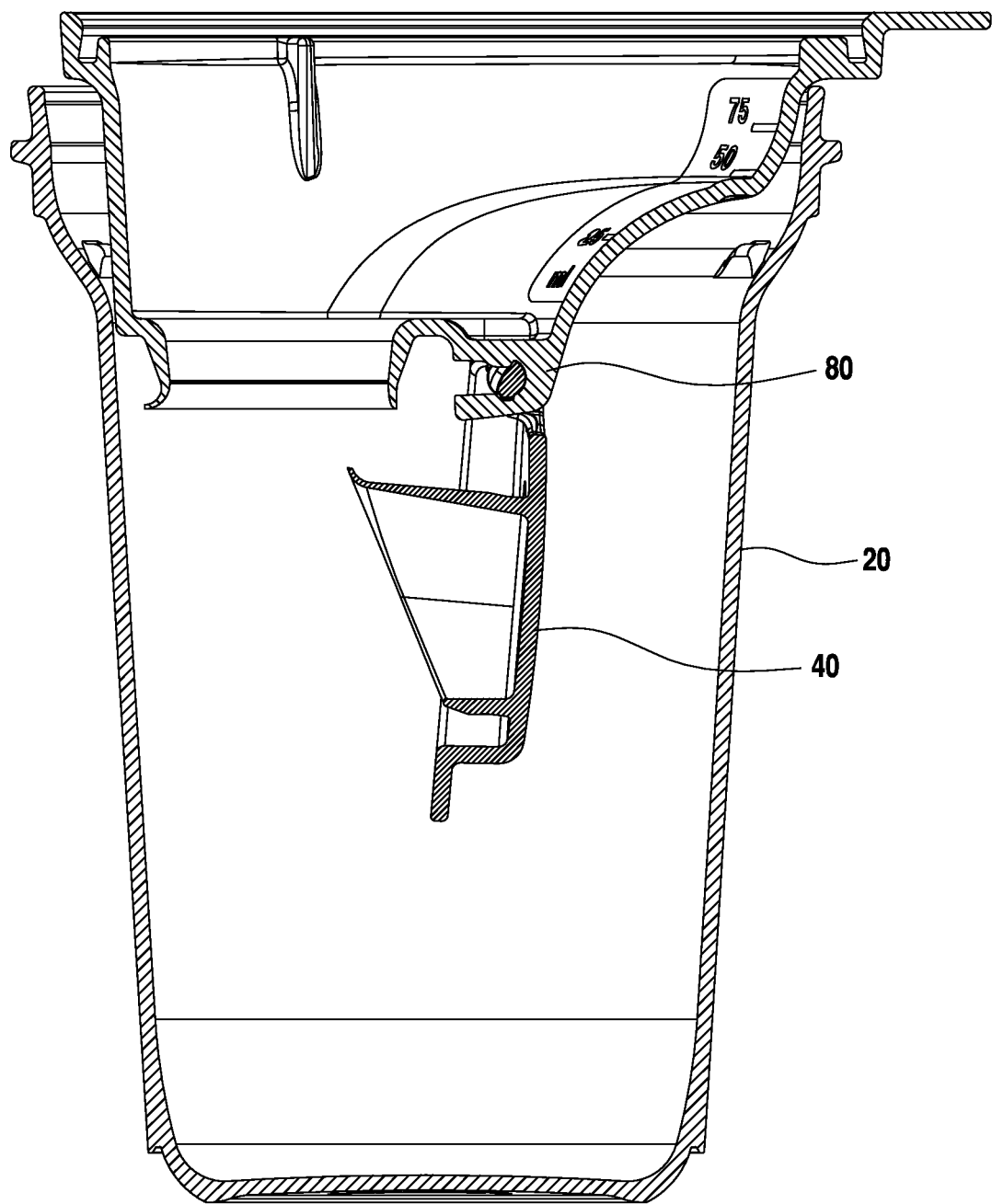
FIG. 11 is a cross-sectional view showing the container in a storage position.

To enhance the versatility of container 10 as a shaker, a series of measuring indicators 104 may be provided on base 20 so that a user can measure a desired volume of a liquid, or indeed a granular material, such as a powder to be mixed with a liquid. As a further feature of the present invention, the cover 80 may be formed with a domed shape, and may include measuring indicators 108. These measuring indicators 108 are inverted such that they are operational when the cover 80 is itself inverted. In that case, the user would close cap 40 to seal and close spout 30, remove cover 80 from base 20, turn over cover 80 as shown in FIG. 9, and then measure a desired volume of material, such as a powder, using further measuring indicators 108. Measuring, indicators may be marked off in ounces (oz), milliliters (mL) or both, as shown. The measuring indicators 104 and/or 108 may be formed on the interior (preferred if the container 10 is formed of an opaque materials) or exterior (if the container is translucent or transparent).

A mixing device 90 having a number of vanes 92, and openings 96, 98 may be provided to enhance the mixing of liquids and solids in use. Mixing device 90 may be seated on extensions 64 and 66, in use, as will be readily understood. It will be appreciated that mixing device 90 may be inverted and used to enhance the juicing of piece of fruit, such as a lemon or orange. A separate juicer for the purpose may likewise be provided.

It is further contemplated that spout 30 may be located on cover 80 for ease of use and cleaning, as shown.

A handle 114 in the form of a tab may be provided on cover 80 to assist in removal of cover 80 from base 20.

Figure 6:
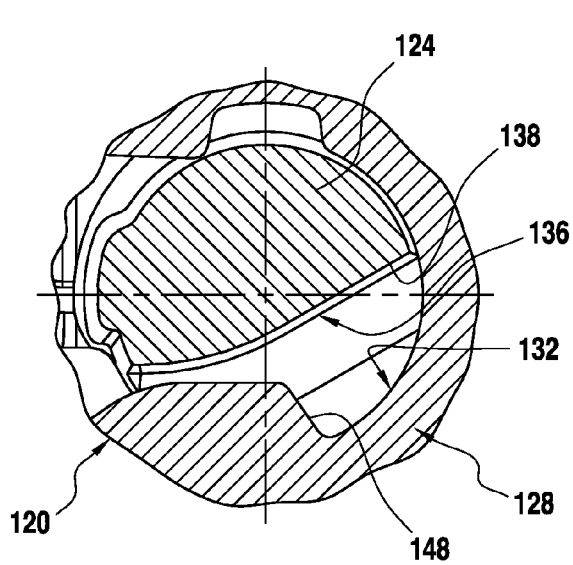
FIG. 6 is a detailed view of the closed position of the cap of FIG. 4.

As noted, in the open position 48 the free edge of the extension 54 will be located above, and within the periphery of, the spout 30. For manually pivoted caps 40 it is desirable to assist the user in achieving this proper open position (and avoid over-rotation). A stop 120 for stopping rotation of cap 40 in its open position 48 may be provided for this purpose. In addition to merely preventing further rotation of cap 40 past the proper open position, this stop 120 may also act to hold the cap in the open position 48 against unintended movement back toward the closed position for holding for cap 40 in its open position 48 so it does not interfere with pouring of a liquid from container 10 out of spout 30 in use. Stop 120 is shown in detail in FIGS. 5-8, for example. Stop 120 may include a female portion 124, in the form of a trunnion, for example, and a male portion 128, in the form of a pin or axle. Trunnion 124 may include a shaped pin receiving portion having a surface 132 for mating with an outer surface 136 of pin 124. Outer surface 136 may include a beveled face 138 which strikes a corresponding angled portion 148 of surface 132. As shown in FIGS. 4 and 6, stop 120 is in its closed position and secured in its closed position by extension 54 having one or more extending portions 162 and 164 which may be configured for mating and securing cap 40 in its closed position on spout 30, such as by engaging portions 172 and 174 of spout 30 respectively. Other arrangements providing the same effect could also be employed.

Figure 7:
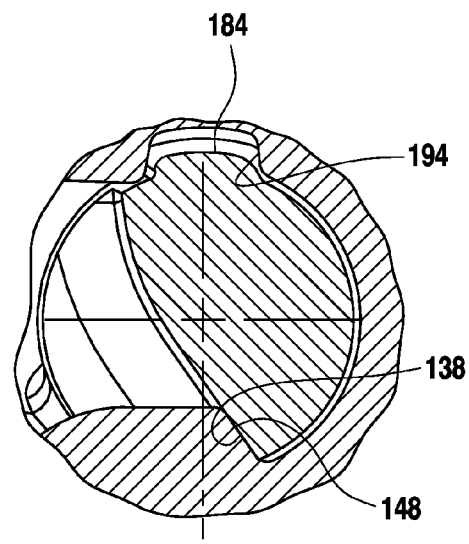
FIG. 7 is a detailed view of the open position of the cap of FIG. 5.
Figure 8:
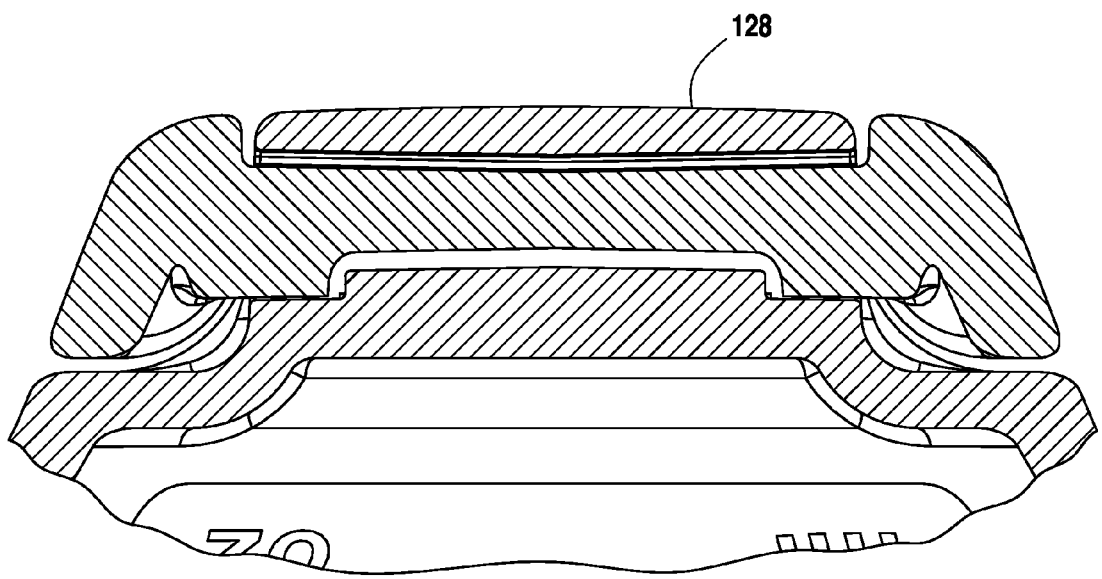
FIG. 8 is an enlarged cross-sectional view taken along line 8-8 of FIG. 4.

FIG. 7 shows cap 40 in its stopped open position of FIG. 5, in which angled or beveled face 138 has abutted face 148 of pin 124. A stop 184 in the form of an extension or pin 124 may be provided to abut and engage an indent 194 in trunnion 124 as best seen in FIGS. 5 and 7, for example. Engagement between extension 184 and indent 194 assists in stopping and holding cap 40 in its desired open position 48. Again, other arrangements providing the same effect could be employed From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A container with a drip-proof spout, comprising:
a container for holding a flowable content, said container having a spout for pouring the content out of said container;
a cap provided adjacent to said spout, said cap having a closed position in which said cap prevents content from being poured from said spout, and said cap having an open position in which the content can be poured from said container out of said spout;
a guiding device provided on an inner face of said cap, said guiding device being configured for guiding residual content on said cap into said spout when said cap is in its open position, wherein said guiding device includes an extension having a free end, and wherein said free end comprises a curved lip for concentrating the content directed from said inner face into said spout; and
a stop is provided preventing said cap from moving past its open position when said cap is moved from said closed position to said open position.

2. A container as in claim 1, wherein:
said guiding device is placed on said inner face so as to be received within said spout when the cap is in the closed position, an exterior face of said guiding device being sized and shaped to fit snugly within and seal against interior walls of said spout when in this same closed position.

3. A container as in claim 1, wherein:
said container includes:
a base having an open top;
a cover is attached to and covers said open top; and
said spout is located on said cover.

4. A container as in claim 3, wherein:
a series of measuring indicators are provided on said base so that a user measure a quantity of content in said base; and
a further series of measuring indicators is provided on said cover so that a user can measure a quantity of content with said cover.

5. A container as in claim 1, wherein:
said stop is configured for holding said cap in its open position for enhancing
the guiding of residual content into said spout by said guiding device.

6. A measuring device, comprising:
a container for holding a material, said container including:
a base having an open top and a closed end;
a cover provided for removably covering and closing said open top;
a spout is provided on said cover so that a volume of material in said device may be poured out of said spout by a user;
a cap provided adjacent to said spout, said cap having a closed position in which said cap prevents content from being poured from said spout, and said cap having an open position in which the content can be poured from said container out of said spout;
a guiding device provided on an inner face of said cap, said guiding device being configured for guiding residual content on said cap into said spout when said cap is in its open position, wherein said guiding device includes an extension having a free end, and wherein said free end comprises a curved lip for concentrating the content directed from said inner face into said spout;
a series of measuring indicators provided on said base so that a user can measure a quantity of material in said base; and
a further series of measuring indicators provided on said cover so that a user can measure a quantity of material with said cover.

7. A measuring device as in claim 6, wherein:
said cover is movable relative to said base so that said further series of measuring indicators may be used by a user to measure a quantity of material with said cover.

8. A measuring device as in claim 6, wherein:
said cover is detachably attached to said base so that a user can use said further series of measuring indicators to measure a quantity of material.

9. A measuring device as in claim 6, wherein:
said series of measuring indicators on said container are configured so that a user can measure a volume of liquid in said base; and
said further series of measuring indicators is configured so that a user can measure a quantity of granular material with said cover.

* * * * *